(12) United States Patent
Shimizu

(10) Patent No.: US 8,517,199 B2
(45) Date of Patent: Aug. 27, 2013

(54) HIGH-PRESSURE TANK WITH SEPARATE PRODUCT AND PRESSURE TESTING SCREW SECTIONS

(75) Inventor: Akira Shimizu, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 50 days.

(21) Appl. No.: 13/103,787

(22) Filed: May 9, 2011

(65) Prior Publication Data

US 2011/0210131 A1    Sep. 1, 2011

Related U.S. Application Data

(63) Continuation of application No. PCT/JP2008/070487, filed on Nov. 11, 2008.

(51) Int. Cl.
*B65D 51/16* (2006.01)
*F17C 13/06* (2006.01)

(52) U.S. Cl.
USPC ............................ 220/203.01; 220/581

(58) Field of Classification Search
USPC ........... 220/589, 588, 586, 582, 581, 202; 206/0.6
IPC ............................ B65D 51/16; F17C 13/06
See application file for complete search history.

(56) References Cited

U.S. PATENT DOCUMENTS

| | | | | |
|---|---|---|---|---|
| 4,106,449 A | * | 8/1978 | Matsumoto et al. | 123/568.12 |
| 4,453,700 A | * | 6/1984 | Otsuki et al. | 251/129.15 |
| 2008/0111322 A1 | * | 5/2008 | Otsubo et al. | 277/654 |

FOREIGN PATENT DOCUMENTS

| | | |
|---|---|---|
| JP | 10-332085 A | 12/1998 |
| JP | 2001-524653 A | 12/2001 |
| JP | 2006-009890 A | 1/2006 |
| JP | 2007-263290 A | 10/2007 |
| JP | 2007-278473 A | 10/2007 |
| JP | 2007-292235 A | 11/2007 |
| WO | 2007/119444 A1 | 10/2007 |

OTHER PUBLICATIONS

Translation of Fuji Heavy (JP 2007-263290), Oct. 11, 2007.*
Translation of Mannesmann (JP 2001-524653), Dec. 4, 2001.*
Translation of Goto (JP 2007-292235), Nov. 8, 2007.*
International Search Report mailed Dec. 9, 2008.

* cited by examiner

Primary Examiner — Robert J Hicks
(74) Attorney, Agent, or Firm — Kenyon & Kenyon LLP

(57) ABSTRACT

A tank having a structure which restricts decline in the strength of a screw section. The tank includes a mouthpiece having a mouthpiece screw section which is formed with a screw thread and has a larger diameter on the outer side than on the inner side in an axial direction of the tank, and a valve having a valve screw section which corresponds only to a portion of the mouthpiece screw section.

7 Claims, 6 Drawing Sheets

HIGH-PRESSURE TANK WITH SEPARATE PRODUCT AND PRESSURE TESTING SCREW SECTIONS

CROSS-REFERENCE TO RELATED APPLICATIONS

This is a continuation application of PCT/JP2008/070487 filed 11 Nov. 2008, the content of which is incorporated herein by reference.

BACKGROUND OF THE INVENTION

1. Field of the Invention

The present invention relates to a tank. More specifically, the present invention relates to improvement in a valve fastening structure in a high-pressure tank which is filled with hydrogen gas or the like.

2. Background of the Invention

For a high-pressure tank used to store hydrogen, or the like, a structure obtained by attaching a valve assembly (a component with an in-built high-pressure valve, and the like) to a mouthpiece provided on a tank opening of the tank main body is used. Furthermore, in attaching the valve assembly to the mouthpiece, a simple screw structure is often employed, in which a male screw section on the valve assembly is screwed together with a female screw section on the mouthpiece (see Patent Document 1, for example).

Patent Document 1: Japanese Patent Application Laid-open No. 2007-263290

However, in a screw structure for a high-pressure tank as described above, there is a problem in that the strength of the screw section declines with repeated use.

SUMMARY OF THE INVENTION

Therefore, it is an object of the present invention to provide a tank having a structure which suppresses decline in the strength of the screw section.

The present inventors made various investigations in order to resolve this problem. With a high-pressure tank, an evaluation test of the amount of expansion and gas tightness must be made for each individual frame (high-pressure tank main body), and for this testing, a test valve must be fitted to the mouthpiece. In order that a test valve of this kind can be used a plurality of times, a material which is harder than the mouthpiece is used for the test valve, for instance, a stainless steel valve is used for an aluminum mouthpiece. However, when the test valve is removed at the end of the evaluation test and a product valve is then fitted, foreign material such as shavings, burr, dirt, or the like may be produced by the screw section of the mouthpiece, due to abrasion (in the specification described below, this foreign matter is referred to generally as "cuttings") and problems due to galling may arise. As a result of thorough investigation into ways to maintain durability when using aluminum for the mouthpiece, and the like, under the circumstances described above, the present inventors arrived at a new discovery relating to the resolution of this problem.

The tank according to the present invention is based on this discovery, and includes a mouthpiece having a mouthpiece screw section which is formed with a screw thread and has a larger diameter on the outer side than on the inner side in an axial direction of the tank, and a valve having a valve screw section which corresponds only to a portion of the mouthpiece screw section. In this tank, when installing a product valve on the mouthpiece, it is possible to use a screw portion of the mouthpiece of which strength has not declined, by using a test valve and a product valve having different positions of the valve screw sections.

In this tank, it is also possible to form a step difference in a hole of the mouthpiece. In this case, when installing the valve, it is possible to judge easily how far the used region of the mouthpiece screw section extends, by means of the step difference.

Alternatively, in this tank, the mouthpiece screw section may have a tapered shape.

Furthermore, in the tank described above, desirably, an evaluation test mouthpiece screw section used for evaluation testing of the tank is formed on the outer side in the axial direction of the tank, and a product mouthpiece screw section is formed on the inner side in the axial direction of the tank, such that the test mouthpiece screw section screws together with a valve screw section of a test valve used for evaluation testing of the tank and the product mouthpiece screw section screws together with a valve screw section of a product valve.

Moreover, desirably, a valve screw section of the product valve also screws together with the test mouthpiece screw section. In this case, more desirably, the valve screw section of the product valve screws together with a whole region of the test mouthpiece screw section. The product valve can be fastened more securely to the mouthpiece by means of the valve screw section of the product valve screwing together with both the product mouthpiece screw section and the test mouthpiece screw section.

In a tank of this kind, for example, the mouthpiece is made of aluminum and the valve is made of stainless steel.

According to the present invention, it is possible to achieve a structure which restricts decline in the strength of the screw section.

EXPLANATION OF REFERENCE NUMERALS

Figure 1:
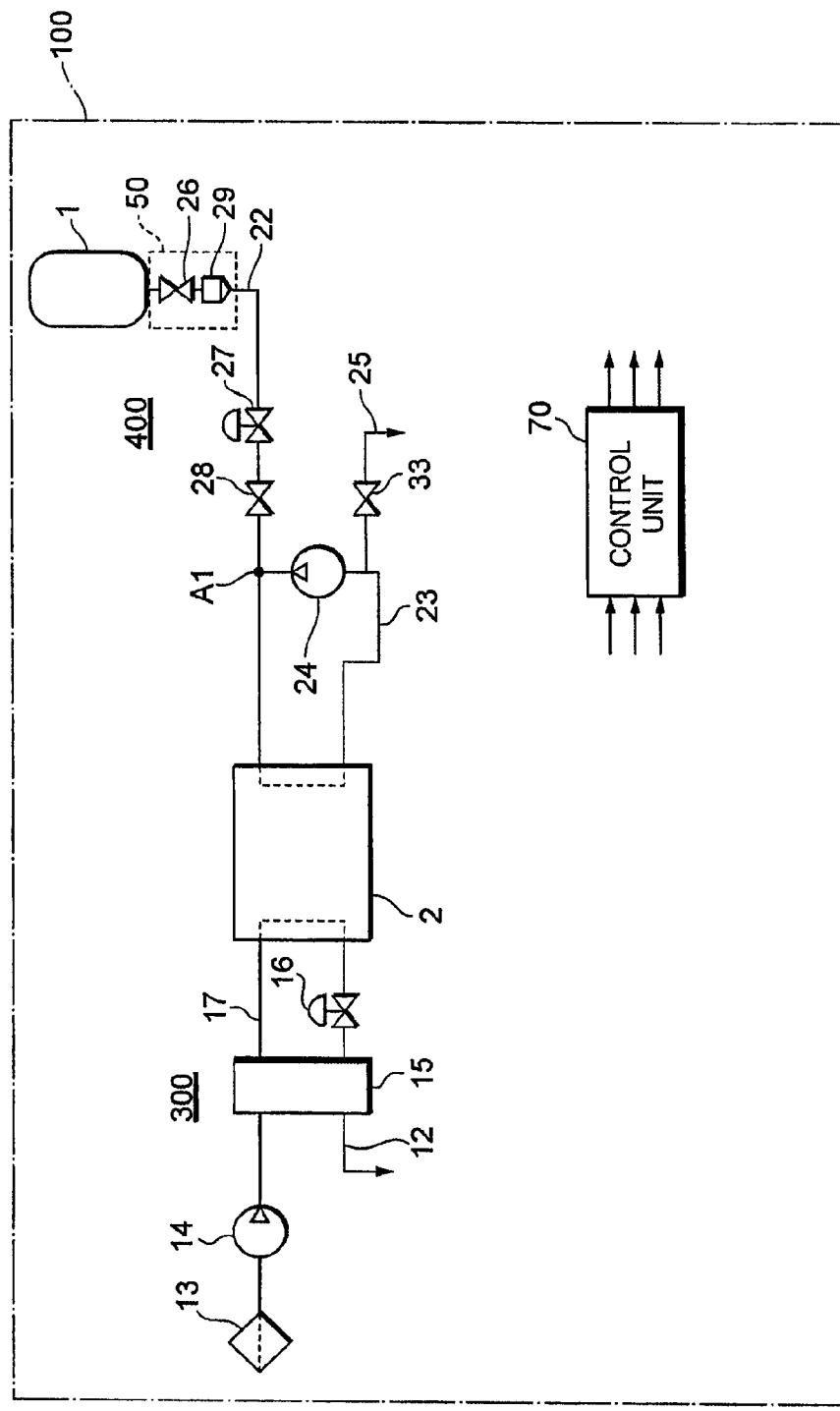
FIG. 1 is a diagram showing an example of the composition of a fuel cell system in one embodiment of the present invention.

1: high-pressure tank (tank); 11: mouthpiece; 11$h$: (mouthpiece) hole; 42: mouthpiece screw section, 42$p$: product screw section; 42*t*: test mouthpiece screw section; 50*p*: product valve (valve); 50*t*: test valve (valve); 51*p*: valve screw section of test valve; 51*t*: valve screw section of test valve; 52: step difference

DETAILED DESCRIPTION OF THE INVENTION

Below, the composition of the present invention is described in detail on the basis of an embodiment shown in the drawings.

FIGS. 1 to 6 show embodiments of a tank and a method of manufacturing same according to the present invention. Below, a case is described in which the tank 1 according to the present invention (called a "high-pressure tank" below) is employed as a high-pressure hydrogen tank as a fuel supply source for a fuel cell system 100.

Firstly, an overview of the fuel cell system according to the present embodiment will be described (see FIG. 1). This fuel cell system 100 is formed as a system including: a fuel cell 2; an oxygen gas pipe system 300 which supplies air (oxygen) as an oxidizing gas to the fuel cell 2, a fuel gas pipe system 400 which supplies hydrogen gas as a fuel gas to the fuel cell 2, and a control unit 70 which performs integrated control of the whole system.

The fuel cell 2 is composed as a solid polymer electrolyte and includes a stacking structure in which a plurality of simple cells are stacked together. The simple cells of the fuel cell 2 each have an air electrode on one surface of an electrolyte consisting of an ion exchange film, a fuel electrode on the other surface thereof, and a pair of separators which border the air electrode and the fuel electrode on either side. The fuel gas is supplied to a fuel gas flow channel in one separator, the oxidizing gas is supplied to an oxidizing gas flow channel in the other separator, and the fuel cell 2 generates electrical power due to this supply of gas.

The oxidizing gas pipe system 300 includes a supply channel 17 along which oxidizing gas for supply to the fuel cell 2 flows, and a discharge channel 12 along which the oxidation off-gas discharged from the fuel cell 2 flows. A compressor 14 which introduces oxidizing gas via a filter 13 and a humidifier 15 which humidifies the oxidizing gas supplied under pressure by the compressor 14 are provided in the supply channel 17. The oxidization off-gas flowing through the discharge channel 12 passes through a back pressure adjustment valve 16 and is supplied for moisture exchange in the humidifier 15, before finally being discharged into the atmosphere outside the system as exhaust gas.

A fuel gas distribution system 400 includes: a high-pressure hydrogen tank forming a fuel supply source (in the present specification, called a "high-pressure tank") 1, a supply channel 22 through which hydrogen gas for supply from the high-pressure tank 1 to the fuel cell 2 flows, a circulation channel 23 for returning the hydrogen off-gas (fuel off-gas) discharged from the fuel cell 2 to a confluence point A of the supply channel 22, a pump 24 for supplying hydrogen off-gas in the circulation channel 23 under pressure to the supply channel 22, and a discharge channel 25 which branches from the circulation channel 23.

The high-pressure tank 1 is suitable as a fuel gas supply tank for a fuel cell car, for example, and although not depicted in particular, three high-pressure tanks 1, for example, are mounted in the rear part of the vehicle. The high-pressure tank 1 constitutes a part of the fuel cell system 100, and supplies fuel gas to the fuel cell 2 via the fuel gas distribution system 400. The fuel gas stored in the high-pressure tank 1 is a high-pressure flammable gas, such as hydrogen gas or compressed natural gas, for example.

The high-pressure tank 1 shown in the present embodiment is composed so as to be able to store hydrogen gas at a pressure of 35 MPa, for example. When a main valve 26 of the high-pressure tank 1 is opened, hydrogen gas flows out into the supply channel 22. Thereupon, the flow rate and pressure of the hydrogen gas are adjusted by an injector 29, whereupon the hydrogen gas is reduced to a pressure of approximately 200 kPa, for example, by a mechanical pressure adjusting valve 27 or other pressure reducing valve at a downstream stage, and then supplied to the fuel cell 2. The main valve 26 and the injector 29 are incorporated into the valve assembly 50 which is indicated by the dotted frame lines in FIG. 1, and the valve assembly 50 is connected to the high-pressure tank 1.

A shut-off valve 28 is provided on the upstream side of the confluence point A of the supply channel 22. The hydrogen gas circulation system is constituted by sequentially connecting a flow channel on the downstream side of the confluence point A of the supply channel 22, a fuel gas flow channel which is formed in the separator of the fuel cell 2, and a circulation channel 23. By opening a purging valve 33 in the discharge channel 25 appropriately during operation of the fuel cell system 100, impurities in the hydrogen off-gas are discharged to a hydrogen diluter (not illustrated) together with the hydrogen off-gas. By opening the purge valve 33, the concentration of impurities in the hydrogen off-gas in the circulation channel 23 is reduced and the hydrogen concentration in the circulated hydrogen off-gas is raised.

The control unit 70 is constituted by a microcomputer having a built-in CPU, ROM, RAM. The CPU performs various processes and control procedures, such as controlling the flow rate in the injector 29 by executing prescribed calculations in accordance with the control program. The ROM stores a control program and control data which is processed by the CPU. The RAM is principally used for various work areas for the purpose of control processing. The control unit 70 inputs detection signals from various pressure sensors and temperature sensors which are used in the gas systems (300, 400) and a coolant system (not illustrated), and outputs control signals to the various constituent elements.

Next, the structure of the high-pressure tank 1 will be described.

Figure 2:
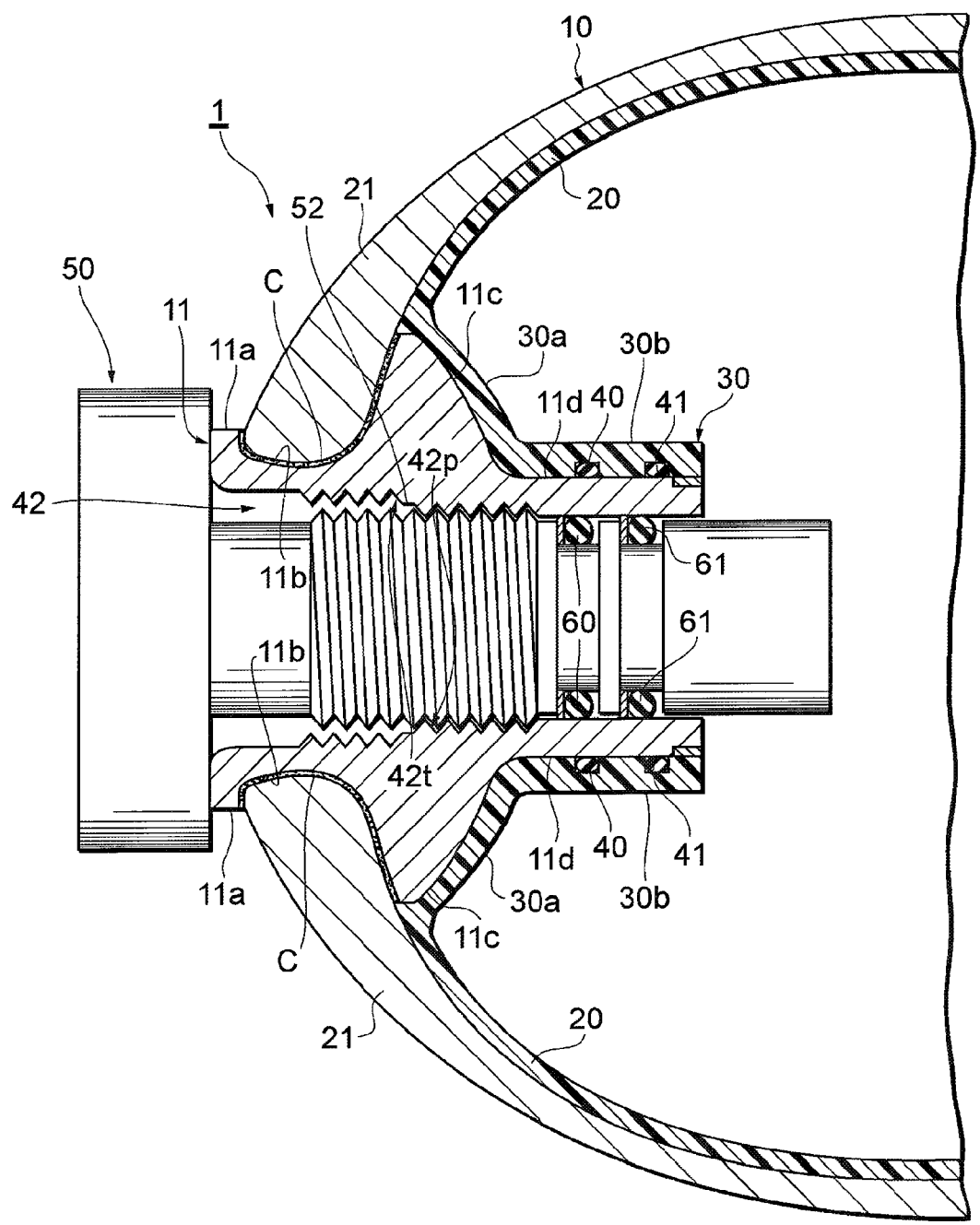
FIG. 2 is a cross-sectional diagram showing the principal part of a tank (high-pressure tank) according to the present invention.

FIG. 2 is a cross-sectional diagram showing a principal part of a high-pressure tank 1. The high-pressure tank 1 has a round cylindrical tank main body 10, both ends of which have a substantially hemispherical shape, and mouthpiece 11 which is attached to one end portion of the tank main body 10 in the lengthwise direction.

The tank main body 10 has a dual layer wall structure, for example, including a liner 20 which is an inner wall layer and, to the outer side thereof, a CFRP layer 21, for example, forming a resin fiber layer (reinforcing layer), which is an outer wall layer.

The liner 20 is formed to substantially the same shape as the tank main body 10. The liner 20 is made, for example, from a polyethylene resin, a polypropylene resin, or another hard resin (the line is also called "resin liner 20" below).

A fold back section 30 which is curved to the inner side is formed on the front end side of the resin liner 20 where the mouthpiece 11 is provided. The fold back section 30 is folded back toward the inner side of the tank main body 10 so as to separate from the CFRP layer 21 on the outer side. The fold back section 30 includes, for example, a diameter reducing section 30*a* in which the diameter gradually reduces toward the front end of the fold back shape, and a round cylindrical section 30*b* having a uniform diameter, connected to the front end of the diameter reducing section 30a. An opening section in the resin liner 20 is formed by this round cylindrical section 30b.

The mouthpiece 11 has a substantially round cylindrical shape and is inserted into the opening of the resin liner 20. The mouthpiece 11 is made of aluminum or aluminum alloy, for example, and is manufactured in a prescribed shape by die casting, or the like. The mouthpiece 11 is installed in the resin liner 20 by insert molding, for instance.

The mouthpiece 11 has a collar section 11a formed on the front end side, for example, (the outer side in the axial direction of the high-pressure tank 1), and an annular recess section 11b formed along the axis of the high-pressure tank 1, to the rear side of the collar section 11a (the inner side in the axial direction of the high-pressure tank 1). The recess section 11b has a curved shape protruding toward the axis side. The vicinity of the front end section of the CFRP layer 21 which has similarly a curved shape makes tight contact with the recess section 11b.

A solid lubricating coating C of fluorine resin, for example, is provided on the surface of the recess section 11b which makes contact with the CFRP layer 21, for example. By this means, the coefficient of friction between the CFRP layer 21 and the recess section 11b is reduced.

The further rearward side of the recess section 11b of the mouthpiece 11 is formed so as to match the shape of the fold back section 30 of the resin liner 20, a projecting section 11c having a large diameter is formed continuously from the recess section 11b, for instance, and a mouthpiece round cylindrical section 11d of uniform diameter is formed to the rear side of the projecting section 11c. The diameter reducing section 30a of the fold back section 30 of the resin liner 20 makes tight contact with the projecting section 11c, and the round cylindrical section 30b makes tight contact with the surface of the mouthpiece round cylindrical section 11d. Sealing members 40 and 41 are interposed between the round cylindrical section 30b and the mouthpiece round cylindrical section 11d.

The valve assembly 50 controls the supply and discharge of the fuel gas between the external gas supply line (supply channel 22) and the interior of the high-pressure tank 1. Sealing members 60 and 61 are interposed between the outer circumferential surface of the valve assembly 50 and the inner circumferential surface of the mouthpiece 11.

The CFRP layer 21 is formed by winding reinforcing fibers impregnated with resin about the outer circumferential surface of the resin liner 20 and the recess section 11b of the mouthpiece 11 by a filament winding (FW) molding method, for example, and curing the resin. Epoxy resin, modified epoxy resin, unsaturated polyester resin, or the like, is used for the resin of the CFRP layer 21. Furthermore, it is possible to use carbon fibers or metal fibers, for instance, as the reinforcing fibers.

Figure 3:
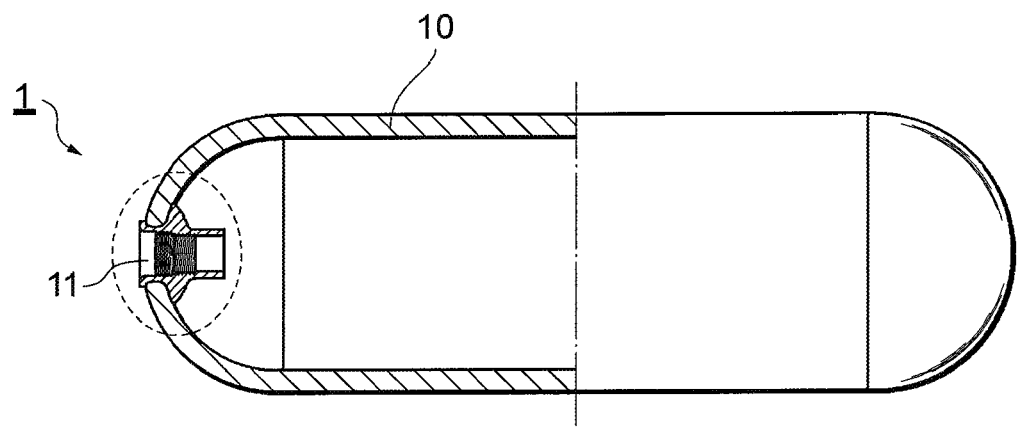
FIG. 3 is a cross-sectional side view of a high-pressure tank.
Figure 4:
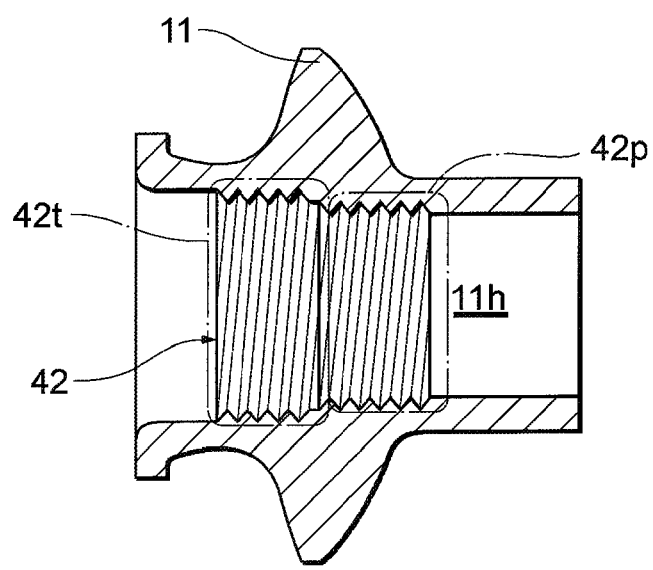
FIG. 4 is an enlarged diagram of the portion enclosed by the dotted lines in FIG. 3.
Figure 5:
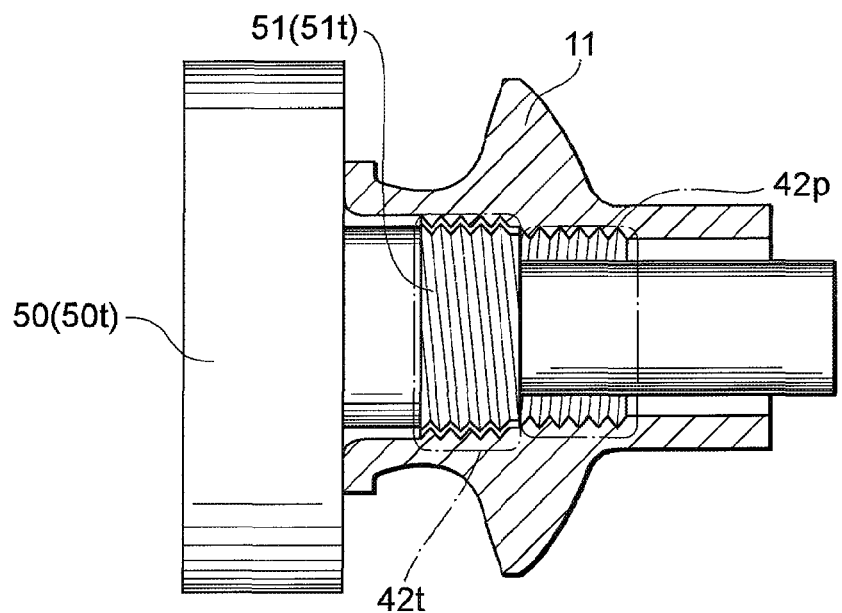
FIG. 5 shows one embodiment of the present invention, and depicts a state where the test valve screw section of the test valve has been screwed together with the test mouthpiece screw section of the mouthpiece.

Next, a fastening structure of the mouthpiece 11 and the valve assembly 50 in the high-pressure tank 1 according to the present embodiment will be described (see FIG. 3 and FIG. 4, and so on). In FIG. 4, FIG. 5, and the like, the mouthpiece 11 is depicted in simplified form, and therefore the outer shape and details are different from the mouthpiece 11 in FIG. 2, but this is not an obstacle to the application of the present invention.

The mouthpiece 11 in this fastening structure has a mouthpiece screw section 42 which is formed in such a manner that the inner diameter thereof is larger on the outer side in the axial direction of the tank than on the inner side. For example, in the case of the present embodiment, the mouthpiece screw section 42 is formed in a so-called two-step structure in which a test mouthpiece screw section 42t is formed on the outer side in the axial direction of the tank and a product mouthpiece screw section 42p is formed on the inner side in the axial direction of the tank. A valve screw section 51 (51t) of the test valve 50t for performing an evaluation test of the high-pressure tank 1 screws together with the test mouthpiece screw section 42t. Furthermore, the valve screw section 51 (51p) of the product valve 50p screws together with at least the product mouthpiece screw section 42p (see FIG. 5 and FIG. 6). In FIG. 4 and other drawings, the test mouthpiece screw section 42t and the product mouthpiece screw section 42p are surrounded by single-dotted frames (see FIG. 4, and so on).

Furthermore, a step difference 52 produced by the difference in the internal diameters of the mouthpiece screw sections 42p and 42t is formed in the hole 11h of the mouthpiece 11 of the high-pressure tank 1 (see FIG. 4, and so on). The step difference 52 of this kind is advantageous in that it makes it possible readily to perceive and ascertain during installation of the valve how far the respective regions of the test mouthpiece screw section 42t and the product mouthpiece screw section 42p in the mouthpiece screw section 42 (the regions used as screw sections) extend.

Furthermore, in the present embodiment, two types of valve having mutually different positions of the valve screw section, namely, a test valve 50t and a product valve 50p, are used as a valve assembly 50 which is installed on the mouthpiece 11. The test valve 50t is formed with a test valve screw section 51 (51t) which only screws together with the test mouthpiece screw section 42t of the mouthpiece 11 (see FIG. 5), and seals a tank main body 10 when installed on each individual frame (high-pressure tank 1), thus creating a situation for performing an evaluation test of the amount of expansion and gas tightness.

Figure 6:
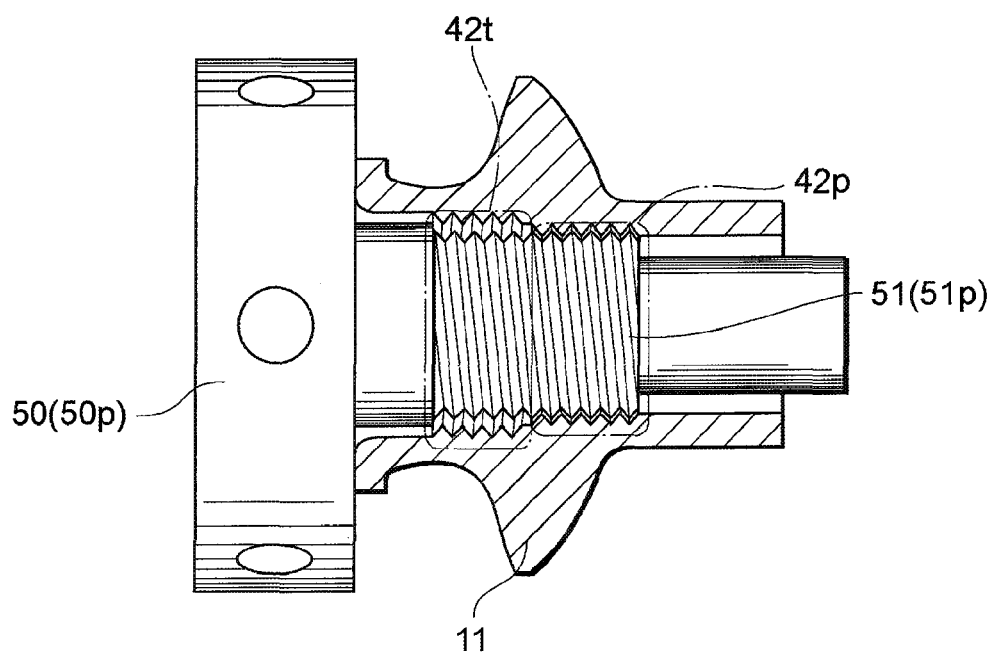
FIG. 6 is a diagram showing a state where the product valve screw section of the product valve is screwed together with the product mouthpiece screw section of the mouthpiece.

On the other hand, the product valve 50p is formed with a product valve screw section 51 (51p) which screws together with at least the product mouthpiece screw section 42p of the mouthpiece 11 (see FIG. 6). The product valve screw section 51p of the present embodiment has a smaller diameter than the test valve screw section 51t of the test valve 50t, so as to screw together with the product mouthpiece screw section 42p (see FIG. 5 and FIG. 6).

There are no particular restrictions on the material of the test valve 50t and the product valve 50p, but in the present embodiment, the valves are made of stainless steel, which is harder than the aluminum used as the material for the mouthpiece 11.

Figure 9:
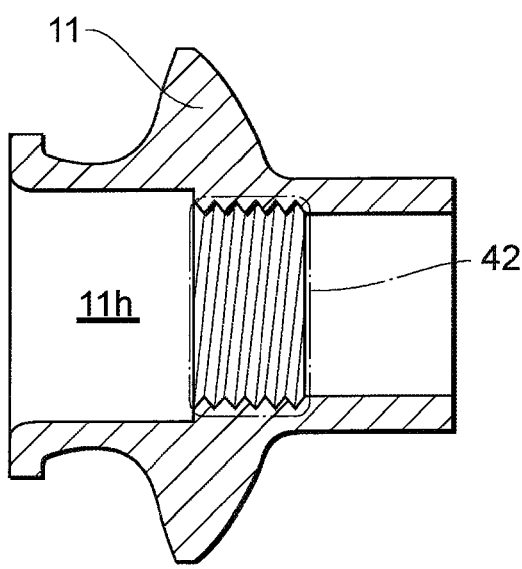
FIG. 9 is a diagram showing an example of the structure of a conventional mouthpiece, for reference purposes.

Here, looking at a conventional high-pressure tank, there is a problem in that the product screw section must also be used for evaluation testing (see FIG. 9). Therefore, it is difficult to avoid situations where cuttings are produced from the mouthpiece due to abrasion, and it is essential to carry out prolonged high-pressure washing of the interior of the tank. Furthermore, once a valve screw section and a mouthpiece screw section have been screwed together and fastened, if the valve screw section is then removed and a product valve is installed, then there is also a risk that problems may occur due to galling.

Moreover, if the high-pressure tank is a hydrogen tank forming a fuel supply tank in a fuel cell system 100 as in the embodiment described above, then there is also the fact that the usable materials are limited from the viewpoint of hydrogen embrittlement. In other words, in the case of a high-pressure tank 1 which is filled with hydrogen gas, for example, at present, the metal materials which can be used for the mouthpiece 11 are limited to stainless steel (SUS), titanium (Ti) and aluminum (Al), in order to avoid embrittlement caused by the hydrogen gas. Conventionally, the mouthpiece 11 and the valve assembly 50 have often both been made of stainless steel, but from the viewpoint of reducing the weight of the high-pressure tank 1, which tends to be heavy, aluminum, which is the lightest of the usable metals, is used as the material of the mouthpiece. However, although this enables weight reduction, during fastening of the valve assembly, scratches are produced in contact surfaces of both the mouthpiece and the valve assembly (for example, in the screw sections which screw together, and the like), and in some cases, these members cannot be reused. On the other hand, in order that the valve for evaluation testing can be used a plurality of times, a stainless steel material which is harder than the mouthpiece 11 is used for the test valve. Therefore, prolonged washing at high pressure must be carried out in order that cuttings from the mouthpiece 11 produced when using the stainless steel test valve are not left inside the high-pressure tank 1. More specifically, according to current technology, the generation of cuttings and prolonged washing of the interior of the tank at high pressure are unavoidable.

On the other hand, according to the high-pressure tank 1 of the present embodiment, actions and beneficial effects such as the following are obtained by the mouthpiece 11 and the valve assembly 50 (test valve 50t and product valve 50p) having the fastening structure described above. More specifically, in order to perform an evaluation test of the amount of expansion and gas tightness for each frame (high-pressure tank 1), a test valve 50t is installed on the mouthpiece 11 (see FIG. 5). In this case, the test valve screw section 51t of the test valve 50t only screws together with the test mouthpiece screw section 42t of the mouthpiece 11. Therefore, the product mouthpiece screw section 42p of the mouthpiece 11 is not used in the evaluation test and does not suffer decline in strength.

After the evaluation test, the test valve 50t is removed from the mouthpiece 11 and the product valve 50p is installed instead (see FIG. 6). As described above, the product valve screw section 51p of the product valve 50p has a smaller diameter than the test valve screw section 51t of the test valve 50, and is formed so as to screw together with the product mouthpiece screw section 42p. Therefore, when the product valve 50p is installed in the mouthpiece 11, it is possible to use the new and previously unused product mouthpiece screw section 42p which has not experienced abrasion or decline in strength, and therefore it is possible to avoid the generation of cuttings and the occurrence of problems due to galling, when screwing the members together.

In summary, in the high-pressure tank 1 according to the present embodiment, by adopting a two-stage structure in which different screw sections are used for evaluation testing and for a product, the generation of cuttings due to abrasion when installing the product valve 50p is suppressed and therefore prolonged high-pressure cleaning is not necessary. Furthermore, by adopting this composition, the durability of the mouthpiece 11 which is made of light-weight aluminum material is also ensured.

Moreover, the test mouthpiece screw section 42t used for evaluation testing is positioned toward the outer side in the axial direction of the tank with respect to the product mouthpiece screw section 42p, in other words, toward the open end of the hole 11h of the mouthpiece 11 (see FIG. 5, and so on). In addition, a step difference 52 is formed between the product mouthpiece screw section 42p and the test mouthpiece screw section 42t. Therefore, this structure yields an advantage in that even if cuttings are produced when the test valve 50 is installed in or removed from the mouthpiece 11, these cuttings are not liable to enter inside the high-pressure tank 1.

Figure 7:
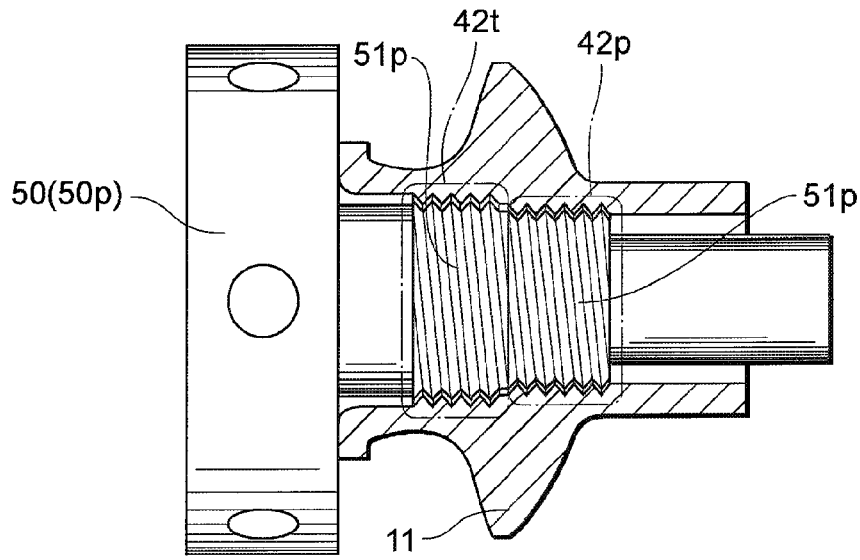
FIG. 7 shows a further embodiment of the present invention, and depicts a state where the product valve screw section of the product value is screwed together with both the product mouthpiece screw section and the test mouthpiece screw section.

The embodiment described above is one desirable example of the present invention, but the invention is not limited to this and can be modified in various ways without departing from the essence of the present invention. For example, in the various embodiments described above, the product valve screw section 51p of the product valve 50p is formed so as to only screw together with the product mouthpiece screw section 42p of the mouthpiece 11 (see FIG. 6), but desirably the product valve screw section 51p is formed so as to screw together with the test mouthpiece screw section 42t of the mouthpiece 11 as well. By means of the product valve screw section 51p of the product valve 50p screwing together with both the product mouthpiece screw section 42p and the test mouthpiece screw section 42t, the product valve 50p is fastened more securely to the mouthpiece 11. For example, in the embodiment shown in FIG. 7, the product valve screw section 51p of the product valve 50p has a two-stage structure, and a small diameter portion of the product valve screw section 51p screws together with the product mouthpiece screw section 42p, in addition to which a large diameter portion of the product valve screw section 51p screws together the test mouthpiece screw section 42t (see FIG. 7). Furthermore, in this case, desirably, the product valve screw section 51p of the product valve 50p screws together with the whole region of the test mouthpiece screw section 42.

Figure 8:
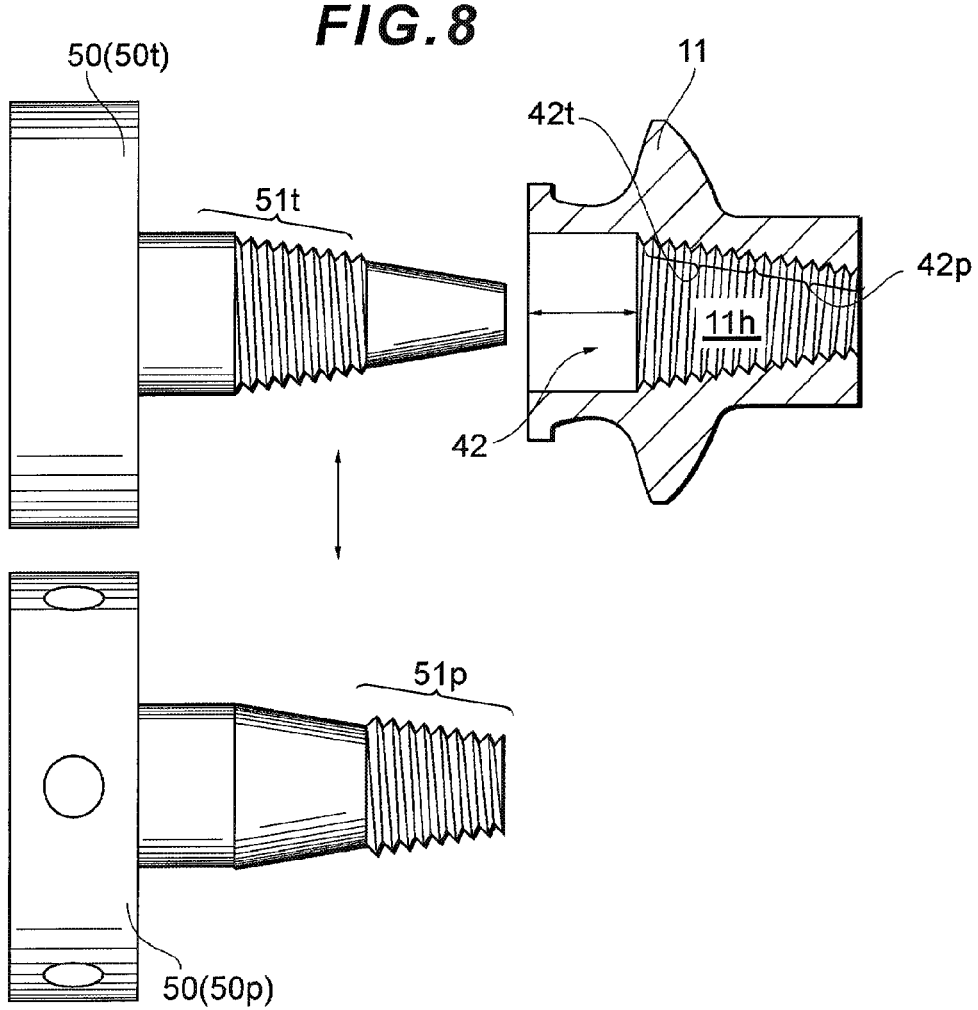
FIG. 8 shows yet a further embodiment of the present invention, and depicts a case where the mouthpiece screw section and the screw section of the valve assembly have a tapered shape.

Moreover, the embodiment described above gives as an example a step-shaped mouthpiece screw section 42 having a two-step structure in which a test mouthpiece screw section 42t is formed on the outer side in the axial direction of the tank and a product mouthpiece screw section 42p is formed on the inner side in the axial direction of the tank (see FIG. 4, and so on), but this is just one suitable example of the present invention. Apart from this, it is also possible to apply the present invention to a case where the mouthpiece screw section 42 (and the screw section of the valve assembly) have a tapered shape, for example, rather than a step shape (see FIG. 8). In this case, for example, it is possible to form the test mouthpiece screw section 42t and the test valve screw section 51t in a large diameter portion (a portion on the outer side in the axial direction of the tank) and to form the product mouthpiece screw section 42p and the product valve screw section 51p in a small diameter portion (a portion on the inner side in the axial direction of the tank). By dividing the screw section used for testing and for a product in this way, when the product valve 50p is installed on the mouthpiece 11, it is possible to screw the product valve screw section 51p together with a product mouthpiece screw section 42p which has not yet been used. The composition described here is a further example, but in summary, if the mouthpiece screw section 42 is formed in such a manner that the diameter thereof on the outer side in the axial direction of the tank is larger than on the inner side (toward the center), and if a valve screw section (in the case of the present embodiment, the test valve screw section 51t or the product valve screw section 51p) corresponding to a portion of the mouthpiece screw section 42 (in the case of the present embodiment, the product mouthpiece screw section 42t or the product mouthpiece screw section 42p) is formed, then it is possible to suppress reduction in the strength of the screw section before the product valve 50p is installed on the mouthpiece 11. Of course, similarly to the case described above, it is possible to further increase the fastening force by forming the product valve mouthpiece section 51p of the product valve 50p so as to screw into the test mouthpiece screw section 42t of the mouthpiece 11 as well, similarly to the case described above.

Furthermore, in the embodiment described above, a mouthpiece screw section 42 is described in which a test mouthpiece screw section 42t is formed on the outer side in the axial direction of the tank (toward the open end) and a product mouthpiece screw section 42p is formed on the inner side in the axial direction of the tank (toward the center), but it is also possible to adopt a reverse composition in which the test mouthpiece screw section 42 is formed on the inner side in the axial direction of the tank and the product mouthpiece screw section 42p is formed on the outer side in the axial direction of the tank. In a case of this kind also, it is possible to suppress decline in the strength of the screw section before the product valve 50p is installed on the mouthpiece 11. From the viewpoint of preventing cuttings produced during installation and removal of the test valve 50t from entering inside the high-pressure tank 1, in general, it is desirable to form the test mouthpiece screw section 42 on the outer side in the axial direction of the tank. If the test mouthpiece screw section 42 is formed on the outer side in the axial direction of the tank, then the screw section is used successively from the outer side toward the inner side in such a manner that the screw section on the outer side in the axial direction of the tank (the test mouthpiece screw section 42t) is used first in the evaluation testing, and subsequently the screw section on the inner side in the axial direction (the product mouthpiece screw section 42p) is used, and therefore cuttings are more readily prevented from entering inside the high-pressure tank 1.

Moreover, in the embodiments described hitherto, the high-pressure tank 1 is a hydrogen tank forming a fuel supply source in a fuel cell system 100, but this is no more than a suitable embodiment of the present invention, and it is also possible to apply the present invention to a tank which is to be filled with a gas or liquid other than hydrogen gas.

From the viewpoint of obtaining strong fastening force when the valve (50t, 50p) is installed on the mouthpiece 11, desirably, each of the screw sections (42t, 42p, 51t, 51p) has a large diameter. If high fastening force can be obtained more readily by increasing the diameter of the screw sections in this way, then the length of the screw sections in the axial direction of the tank is shortened, and it is therefore possible to reduce the size of the mouthpiece 11 and the valves 50t and 50p. However, if the diameter of the hole 11h of the mouthpiece 11 is too large, then cuttings become more liable to enter and reduction in the strength of the actual mouthpiece 11 may occur. Therefore, it is desirable to set a suitable balance in respect of this.

The present invention is suitable for application to tanks of various types having a valve fastening structure, such as high-pressure tanks, or the like, which are, filled with hydrogen gas, or the like.

The invention claimed is:

1. A tank, comprising:
   a mouthpiece having a mouthpiece screw section which is formed with a screw thread and has a larger diameter on the outer side than on the inner side in an axial direction of the tank; and
   an evaluation test valve having a valve screw section corresponding only to one part of the mouthpiece screw section, and a product valve having a valve screw section corresponding only to the other part of the mouthpiece screw section,
   wherein an evaluation test mouthpiece screw section used for evaluation testing of the tank is formed on one side of the outer side in the axial direction of the tank and the inner side in the axial direction of the tank, and a product mouthpiece screw section of the tank is formed on the other side.

2. The tank according to claim 1, wherein a step difference is formed in a hole of the mouthpiece.

3. The tank according to claim 1, wherein the mouthpiece screw section has a tapered shape.

4. The tank according to claim 1, wherein the evaluation test mouthpiece screw section is formed on the outer side in the axial direction of the tank, and the product mouthpiece screw section is formed on the inner side in the axial direction of the tank, such that the test mouthpiece screw section screws together with the valve screw section of the test valve used for evaluation testing of the tank and the product mouthpiece screw section screws together with the valve screw section of the product valve.

5. The tank according to claim 4, wherein the valve screw section of the product valve also screws together with the test mouthpiece screw section.

6. The tank according to claim 5, wherein the valve screw section of the product valve screws together with a whole region of the test mouthpiece screw section.

7. The tank according to claim 1, wherein the mouthpiece is made of aluminum and the valve is made of stainless steel.

* * * * *